(12) United States Patent
Liang

(10) Patent No.: US 12,478,259 B2
(45) Date of Patent: Nov. 25, 2025

(54) MOBILE INTRAORAL CAMERA POWERED WITH ARTIFICIAL INTELLIGENCE

(71) Applicant: Arizona Board of Regents on Behalf of the University of Arizona, Tucson, AZ (US)

(72) Inventor: Rongguang Liang, Tucson, AZ (US)

(73) Assignee: Arizona Board of Regents on Behalf of the University of Arizona, Tucson, AZ (US)

( * ) Notice: Subject to any disclaimer, the term of this patent is extended or adjusted under 35 U.S.C. 154(b) by 155 days.

(21) Appl. No.: 17/995,595

(22) PCT Filed: Apr. 5, 2021

(86) PCT No.: PCT/US2021/025790
§ 371 (c)(1),
(2) Date: Oct. 6, 2022

(87) PCT Pub. No.: WO2021/207079
PCT Pub. Date: Oct. 14, 2021

(65) Prior Publication Data
US 2023/0148852 A1      May 18, 2023

Related U.S. Application Data

(60) Provisional application No. 63/005,614, filed on Apr. 6, 2020.

(51) Int. Cl.
*A61B 5/00*      (2006.01)
*A61B 1/00*      (2006.01)
(Continued)

(52) U.S. Cl.
CPC ........ *A61B 5/0088* (2013.01); *A61B 1/00096* (2013.01); *A61B 1/04* (2013.01);
(Continued)

(58) Field of Classification Search
CPC ..... A61B 5/0088; A61B 1/00096; A61B 1/04; A61B 1/043; A61B 1/06; A61B 1/0646;
(Continued)

(56) References Cited

U.S. PATENT DOCUMENTS

| 6,181,369 B1 | 1/2001 | Ooshima et al. |
| 7,139,016 B2 | 11/2006 | Squilla et al. |

(Continued)

FOREIGN PATENT DOCUMENTS

| KR | 101145715 B1 | 5/2012 |
| WO | 2019035024 A1 | 2/2019 |

(Continued)

OTHER PUBLICATIONS

International Search Report and Written Opinion mailed Jul. 8, 2021 for International Patent Application No. PCT/US2021/025790 (14 pages).

(Continued)

*Primary Examiner* — Hesham K Abouzahra
(74) *Attorney, Agent, or Firm* — Perkins Coie LLP

(57) ABSTRACT

Systems, devices and methods for imaging hard-to-view and hard-to-reach places in the oral cavity, such as at the base of the tongue and tonsillar regions, are described. An example mobile intraoral imaging system includes a white light source and a blue or ultraviolet light source for illuminating a region in the oral cavity. The system includes a mobile device configured to receive information associated with reflected and autofluorescent light from the region in the oral cavity, as well as a semi-flexible probe that includes a bendable tip; the probe is changeable in shape to allow insertion in the oral cavity and includes a camera that is positioned at a section of its tip to capture the reflected and autofluorescent light. The system enables quick acquisition (Continued)

of high-quality images, and allows remote imaging and diagnosis of suspicious lesions in the oral cavity.

21 Claims, 9 Drawing Sheets

(51) Int. Cl.
    *A61B 1/04*     (2006.01)
    *A61B 1/06*     (2006.01)
    *A61B 1/24*     (2006.01)

(52) U.S. Cl.
    CPC .............. *A61B 1/043* (2013.01); *A61B 1/06* (2013.01); *A61B 1/0646* (2013.01); *A61B 1/0661* (2013.01); *A61B 1/24* (2013.01); *A61B 5/0071* (2013.01); *A61B 5/7264* (2013.01)

(58) Field of Classification Search
    CPC ....... A61B 1/0661; A61B 1/24; A61B 5/0071; A61B 5/7264; A61B 1/05
    See application file for complete search history.

(56) References Cited

U.S. PATENT DOCUMENTS

| | | | |
|---|---|---|---|
| 9,463,081 | B2 | 10/2016 | Urakabe |
| 11,173,320 | B2 | 11/2021 | Mayer |
| 2003/0148243 | A1* | 8/2003 | Kerschbaumer ... A61B 1/00052 433/29 |
| 2009/0017416 | A1 | 1/2009 | Nguyen et al. |
| 2010/0020165 | A1* | 1/2010 | Crucs ..................... A61B 6/512 348/E7.085 |
| 2010/0238279 | A1 | 9/2010 | Thoms et al. |
| 2014/0207003 | A1* | 7/2014 | Gilhuly ................ A61B 5/0088 600/476 |
| 2017/0196459 | A1 | 7/2017 | Lam et al. |
| 2021/0307597 | A1 | 10/2021 | Wilder et al. |
| 2021/0389175 | A1 | 12/2021 | Leblanc |

FOREIGN PATENT DOCUMENTS

| | | | | |
|---|---|---|---|---|
| WO | WO-2020023377 | A1 * | 1/2020 | .......... A61B 1/0676 |
| WO | 2021207079 | A1 | 10/2021 | |
| WO | 2024076867 | A1 | 4/2024 | |

OTHER PUBLICATIONS

International Search Report and Written Opinion from International Application No. PCT/US2023/075391 dated Feb. 20, 2024 (15 pages).

Nauta et al. "Review Photodynamic therapy of Oral Cancer," European Journal of Oral Sciences, 1996, 104:69-81.

* cited by examiner

MOBILE INTRAORAL CAMERA POWERED WITH ARTIFICIAL INTELLIGENCE

CROSS REFERENCE TO RELATED APPLICATION(S)

This patent document is a 371 National Phase Application of International Patent Application No. PCT/US2021/025790, filed Apr. 5, 2021, which claims priority to the provisional application with Ser. No. 62/005,614 titled "MOBILE INTRAORAL CAMERA POWERED WITH ARTIFICIAL INTELLIGENCE," filed Apr. 6, 2020. The entire contents of the above noted applications are incorporated by reference as part of the disclosure of this document.

STATEMENT REGARDING FEDERALLY SPONSORED RESEARCH OR DEVELOPMENT

This invention was made with government support under Grant Nos. EB022623 and CA239682, awarded by National Institutes of Health. The government has certain rights in the invention.

TECHNICAL FIELD

The disclosed embodiments relate to compact imaging devices and in particular to devices for imaging oral cavity.

BACKGROUND

Early diagnosis of oral cancer is important for improving the survival rates and reducing complications associated with late-stage cancers. However, diagnosing oral lesions is challenging due to a reliance on subjective analyses of clinical features such as color, texture, and consistency, which may cause subtle lesions to remain undetected, or make it difficult to distinguish benign oral lesions from dysplasia and early stage cancer. Therefore, there is a need to improve oral cancer screening and management.

SUMMARY

The disclosed embodiments, among other features and benefits, enable imaging and diagnosis of diseases associated with the oral cavity, and further allow imaging of hard-to-view and hard-to-reach places at the base of the tongue and tonsillar regions. In some embodiments, an intraoral imaging system is described that includes multiple light sources, a flexible probe, a mobile device and a cloud-based system that, along with a neural network processing engine, enable acquisition of images with higher quality at high speeds, and enable easy, accurate and convenient imaging and diagnosis of suspicious lesions that can be readily used in remote locations.

One aspect of the disclosed technology relates to a mobile intraoral imaging system that includes a first light source configured to provide white light for illuminating a region in an oral cavity, and a second light source configured to provide light in a blue or ultraviolet range of wavelengths for illuminating the region in the oral cavity. The system further includes a mobile device comprising a processor and a memory including instructions stored thereon, where the instructions upon execution by the processor cause the processor to receive information associated with reflected and autofluorescent light that is received from the region in the oral cavity. The mobile intraoral imaging system also includes a semi-flexible probe including a tip that is bendable in one or more directions to an angle within a maximum bending range of angles. The semi-flexible probe is changeable in shape to allow insertion in the oral cavity and includes a camera that is positioned at a section of the tip to capture the reflected and autofluorescent light from the region in the oral cavity.

DETAILED DESCRIPTION

Figure 1:
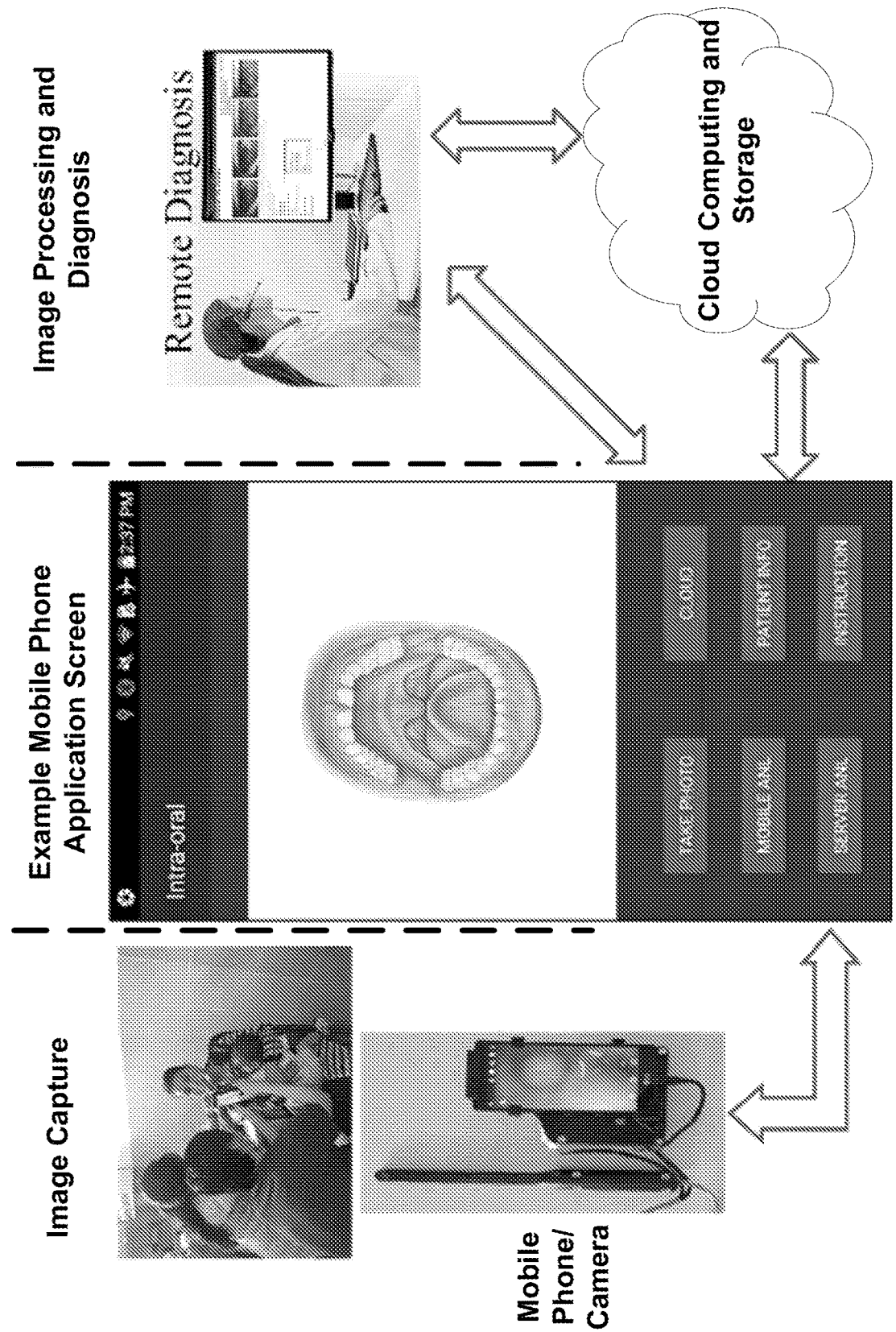
FIG. 1 illustrates a mobile imaging platform for improved oral cancer screening and management suitable for use in low-resource settings.

In the United States alone, the expectation for 2018 is that over 50,000 new cases of oral cancer and over 10,000 deaths (one per hour) will occur. The five-year survival rate for US patients with localized disease at diagnosis is 83%, and only 32% for those whose cancer has metastasized. Worldwide, there are over 640,000 new cases of oral cancer each year with approximately two-thirds in low- and middle-income countries (LMICs)—the rates are particularly high in South and South-East Asia. The survival and cure rates in developing countries are only 10-40% and approximately 30%, respectively. Overall, the poor survival rates are primarily due to late diagnosis, with more than two-thirds of all cases diagnosed after metastasis.

Diagnosing oral lesions is challenging because the diagnoses relies, in significant part, on subjective analyses of clinical features such as color, texture, and consistency. Therefore, subtle lesions can pass undetected, and benign oral lesions are difficult to distinguish from dysplasia and early stage cancer. Accurate diagnosis and optimal treatment planning and execution are further hindered by lesion heterogeneity and field cancerization. Biopsy remains the diagnostic gold standard for detailed diagnosis, treatment planning, execution, and monitoring, but the selection of biopsy sites is reliant on visual examination in the absence of a better alternative. Clinical appearance is not a reliable predictor of pathology, however, and some lesions are not visually apparent. Finally, treatment-related changes in the appearance mean it is difficult to monitor for a recurrence of intraoral neoplasia using customary visual exam and palpation. Consequently, recurrences are not detected early enough to minimize long-time morbidity and mortality.

The increase in the number of human papilloma virus (HPV)-related cancers poses an additional challenge in oral and oropharyngeal squamous cell carcinoma (OSCC) detection. HPV-related cancers typically occur at the base of the tongue and the tonsillar region of the oropharynx—areas that are not amenable to unaided visual inspection or currently available imaging devices. In addition, HPV-related cancers are often asymptomatic at the early stages and can remain undiagnosed until they reach an advanced stage. Therefore, a new device that can reach and diagnose these poorly accessible, high-risk sites can considerably improve early detection, diagnostic accuracy, and outcomes.

Currently there is considerable interest in autofluorescence imaging (AFI) as a potential screening tool for epithelial cancers, including oral, cervical, esophageal, and lung cancers. Autofluorescence is the natural emission of light by biological tissues when they have absorbed light. In particular, when excited by violet/blue light, the premalignant and malignant tissues typically exhibit a characteristic loss of fluorescence, especially in the green wavelength range. Potentially pre-malignant oral lesions and cancers are seen as dark grey or black areas and can be distinguished from the surrounding normal tissue.

Using autofluorescence imaging techniques, several tools have recently been developed as screening adjuncts, but each of them has some major limitations, preventing them from becoming an effective solution for oral cancer screening. For example, one technique merely enables the user to evaluate the fluorescence signal based on the user's subjective visual assessment. Detection outcomes are highly dependent on user experience in oral cancer detection and skill in operating this device. Moreover, while such devices are designed to access the anterior portion of the oral cavity, the posterior regions (specifically the oropharyngeal regions) may receive sub-optimal evaluation because of the difficulty of access, and convenient camera kits are not available.

Other systems essentially provide an illumination device; the user wears filtered glasses to perceive fluorescence loss or reflectance signal. In addition to its low fluorescence image contrast due to limited filter performance, diagnostic accuracy is also highly dependent on user experience in oral cancer detection and operator skill in using the device, as the user makes a diagnostic decision based on his/her direct visual examination of the oral tissues. Therefore, a well-trained specialist is needed.

These and other devices have four common limitations due to their reliance on the human eye to screen the oral cavity without an intra-oral probe: (1) a large portion of the oral tissues (for example, sublingually, base and borders of the tongue, buccal and posterior regions as well as inside surfaces of the lips) cannot be imaged, as those surfaces are blocked by oral structures, remaining inaccessible to the current devices, (2) resolution of the devices is low, exacerbating the risk of missing early stage OSCC, (3) strong confounding tooth autofluorescence causes interference with soft tissue autofluorescence images, reducing diagnostic performance, and (4) ambient light also reduces the contrast—and hence the diagnostic potential—of the soft tissue autofluorescence image, as external light has a strong component in the working fluorescence spectral range.

Various complex optical spectroscopy and high-resolution imaging techniques have been investigated, including: 1) Raman, diffuse reflectance, autofluorescence, and elastic scattering spectroscopy; 2) optical coherence tomography; and 3) reflectance confocal, fluorescence confocal, microendoscopy, multiphoton, and fluorescence lifetime imaging. For various reasons, none has been adopted clinically for oral cancer diagnosis. Common barriers to clinical application include: 1) incommensurate cost and difficulty of use; 2) an output that is not directly diagnostic and/or guiding for clinical decision-making and is therefore not suited to clinician use; 3) the field of view (FOV) is too small to readily locate and characterize regions of interest; and 4) the imaging speed is slow because most of the techniques use point imaging followed by scanning to create 2-D/3-D images.

To address the critical need for a clinical tool capable of accurately detecting, diagnosing, and mapping early mucosal changes and hence optimizing treatment planning and reducing morbidity and mortality, multimodality precision intraoral imaging systems and methods are described that are enabled by deep learning to overcome the critical barriers to clinical application, to improve the diagnosis of oral diseases, and provide a seminal contribution to mitigate the uniquely poor oral cancer prognosis and outcomes. The disclosed devices and systems integrate wide-FOV polarized white light imaging (pWLI), autofluorescence imaging (AFI), and advanced deep learning image classification techniques to screen oral cavities and identify oral neoplasia. The disclosed clinical devices accurately image oral lesions and are economical, easy to use, and offer the following advantages: 1) a novel semi-flexible intraoral probe allows reaching the base of the tongue and tonsils for oral and oropharyngeal cancer imaging; 2) a wide-FOV AFI and pWLI enable rapid scan of oral tissues to identify suspicious regions; 3) a deep learning-based lesion classification and margin mapping engine provides clinical decision-making guidance on the need for a biopsy and the biopsy location(s); and 4) whole-mouth and intraoral imaging capability enable remote specialists to make accurate diagnosis.

The disclosed embodiments include a mobile imaging platform that specifically addresses critical barriers to improve oral cancer screening and management in low-resource settings, as illustrated in FIG. 1. The mobile imaging platform includes a smart phone (or a mobile device), a mobile software application (mobile app), an imaging device (e.g., camera), and a cloud computing and web application.

Mobile App Examples

Figure 2:
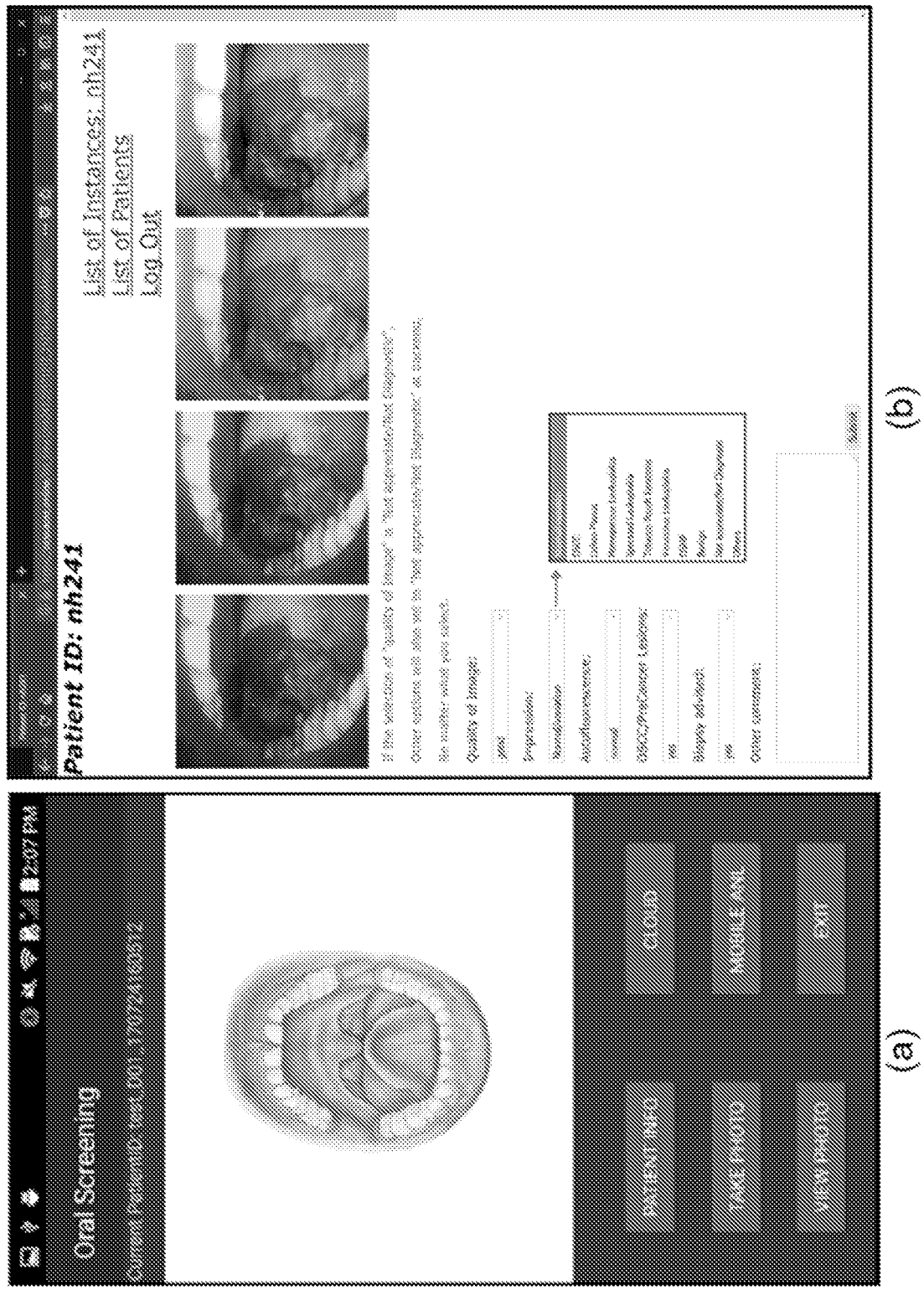
FIG. 2 illustrates an example mobile application screen and an example cloud-based web application page in accordance with example embodiments.

In order to develop a more user-friendly mobile app for on-site health worker and Web App for remote specialists, a cloud-based system is implemented for remote diagnosis and triage guidance. FIG. 2 shows examples of a mobile app screen in panel (a) and a cloud-based Web application page in panel (b). Mobile app capabilities include recording patient ID, screening the mouth cavity, capturing and pre-processing images, uploading images to the cloud-based Web application for remote diagnosis, and relaying the remote diagnosis and any guidance from the remote specialist to the on-site community worker. Every time the new images are uploaded, the cloud-based image processing routine can be automatically triggered to process these new images. Remote specialists can be notified immediately when new images are uploaded, enabling them to review the images. The remote diagnosis results can be then sent to the field workers with triage instructions.

In some embodiments, customized image processing algorithms are included as part of a customized mobile application, which can enhance image quality, as well as saving and uploading the images to the cloud for remote diagnosis.

Image Processing Examples

Figure 3:
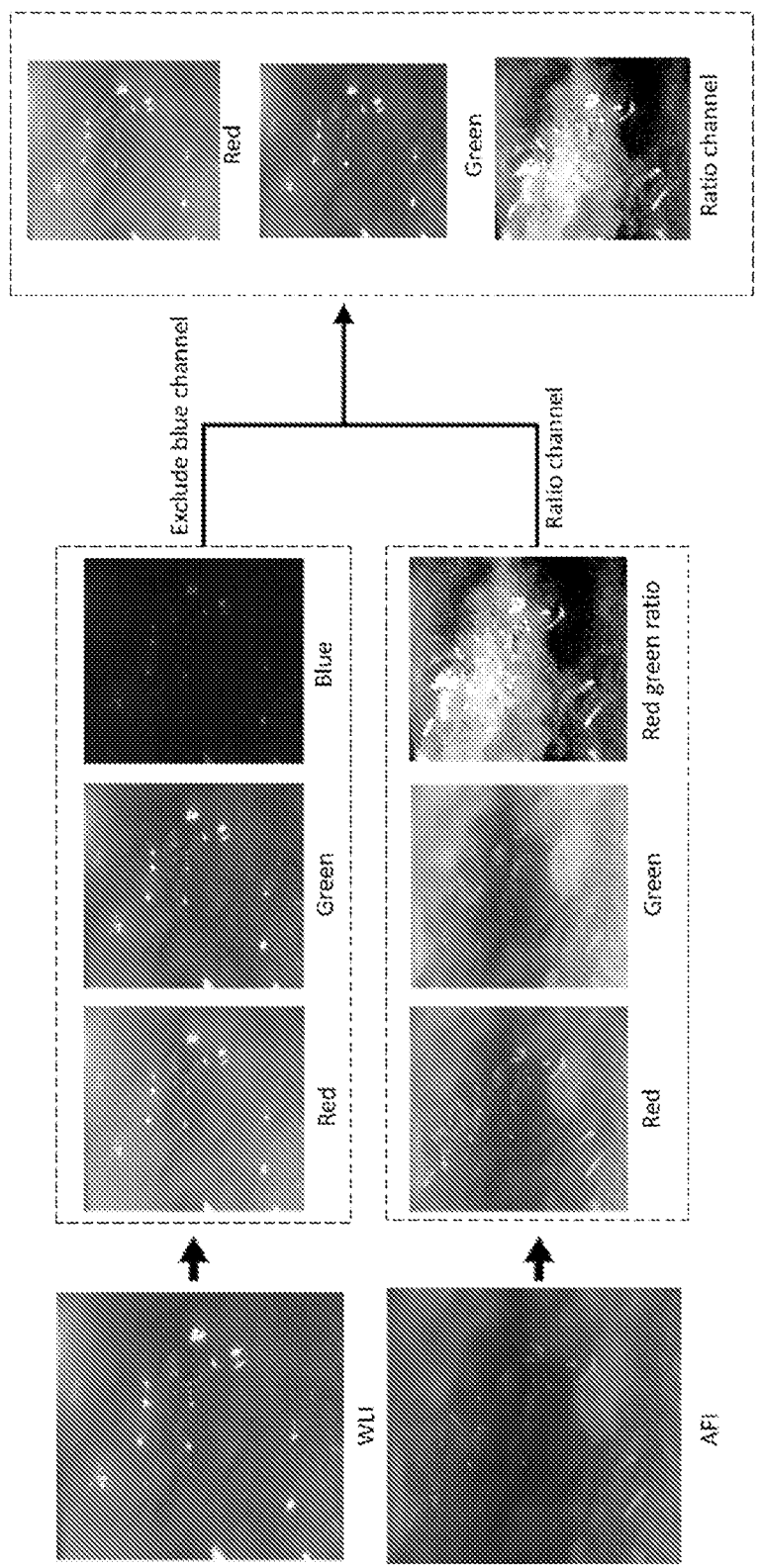
FIG. 3 illustrates an overview diagram of data preparation for dual-mode image classification in accordance with an example embodiment.

As noted earlier and described further below, the disclosed systems provide dual mode operability by providing white light and autofluorescence imaging. The disclosed systems also include convolutional neural network (CNN) classification for dual-modality images. To this end, a new three-channel dataset from the autofluorescence and white light images are created. FIG. 3 provides an overview of data preparation for dual-mode image classification. The top row illustrates an image obtained based on WLI, having red, green and blue channel images. The bottom row illustrates an image obtained based on AFI, with associated red, green and red-to-green ratio images. Because a long-pass filter is added in front of the CMOS sensor to block the excitation light around 405 nm, the pWLI blue channel has a low signal and a high noise level. This blue channel is thus excluded. The use of polarized light improves image quality by reducing specular reflections. In autofluorescence images, the ratio of the red and green channels includes information related to the loss of fluorescence signal, which correlates with OPML and malignant lesions. Rather than using both three-channel autofluorescence and white light images to train the CNN, a single three-channel image is created by using: 1) the green and red channels from the white light image and 2) the normalized ratio of red and green channels from the autofluorescence image as the third channel.

Figure 4:
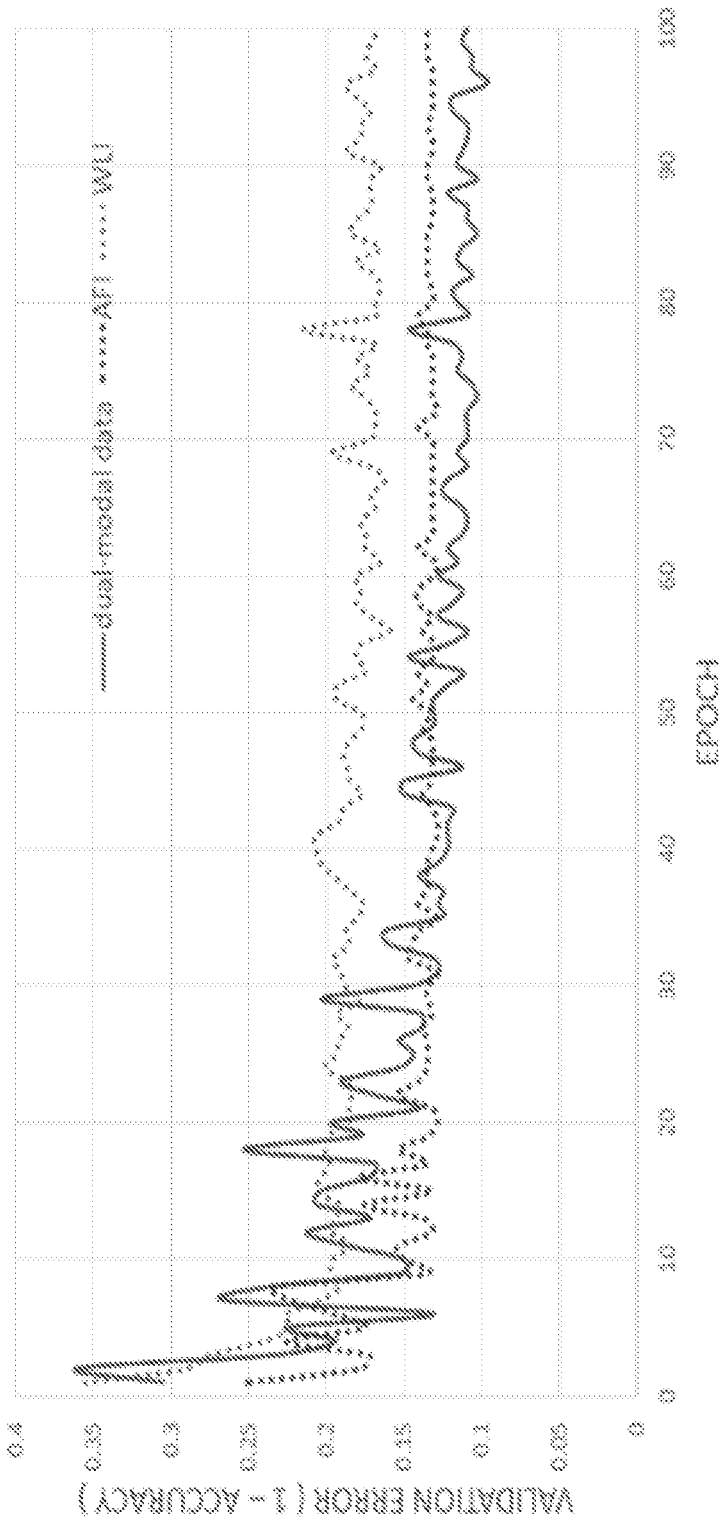
FIG. 4 illustrates example comparison plots of validation error versus epoch value for a convolutional neural network that was trained independently with autofluorescence imaging (AFI), polarized white light imaging (pWLI), and dual-mode images.

To achieve the best performance with a small dataset, different neural network architectures VGG-CNN-M, VGG-CNN-S, and VGG-16 were evaluated. These architectures provide only a few examples of different types of networks that can be used. The smaller network VGG-CNN-M with five convolutional layers produced better than a very deep network with 13 convolutional layers—most likely due to an increase in network complexity that causes overfitting when training a small dataset. To compare classification performance, the VGG-CNN-M was trained independently with AFI, pWLI, and dual-mode images, as illustrated in FIG. 4. Clearly, a neural network trained with dual-mode images had the best performance and produced lower validation errors, while training with only white light images produced the worst performance. This result is expected as more features can be extracted from dual-mode images to classify images.

Figure 5:
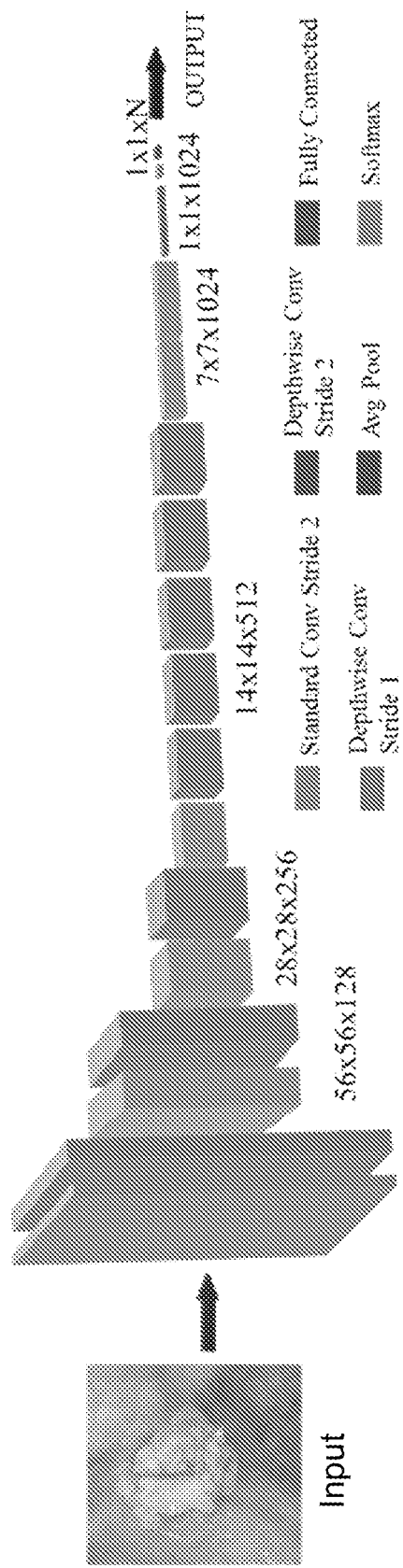
FIG. 5 illustrates an example configuration of a Mobile-Net convolutional neural network model in accordance with an example embodiment.

In some embodiments, a mobile image classification method is provided using a convolutional neural network model called MobileNet and the network is trained with only white light images for two categories—normal and abnormal. The MobileNet model is based on depthwise separable convolutions which factorize a standard convolution into a depthwise convolution and a 1×1 convolution called a pointwise convolution. A standard convolution process filters and combines inputs into a new set of outputs in one-step, while the depthwise separable convolution splits this into two layers, one for filtering and the other for combining. The factorization has the effect of drastically reducing computation and model size. MobileNet with depthwise separable convolutions tremendously reduces the computational cost, number of parameters and model size with only a small compromise in accuracy. The model also has less trouble with overfitting since it has a smaller size and considerably fewer parameters. Counting depthwise and pointwise convolutions as separate layers, MobileNet has 28 layers as shows in FIG. 5.

Image Probe Examples

Common sites for oral cancer include the lateral border and base of the tongue, floor of mouth, buccal mucosa, lips, gingiva, sulci, palate and peri-tonsillar area. In many individuals adequate imaging locations in the mouth such as the base of the tongue and peritonsillar areas that have high HPV-related oral cancer risk is difficult or impossible.

Figure 6:
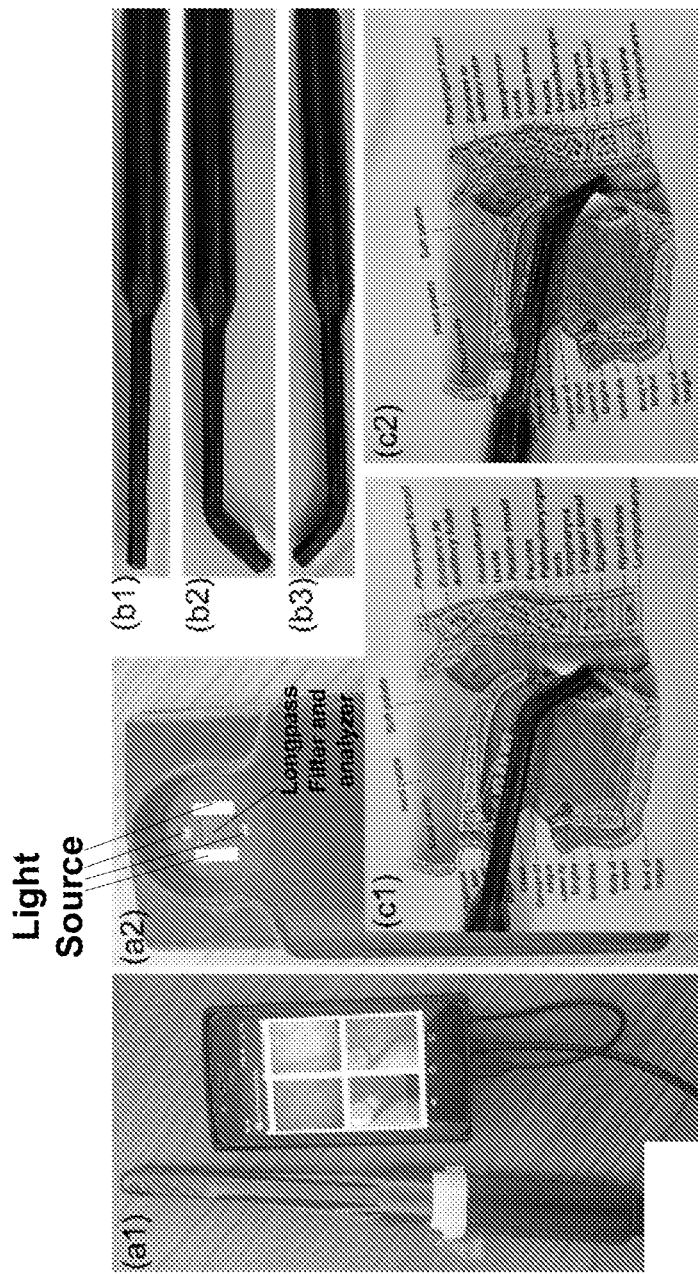
FIG. 6 illustrates configurations of intraoral imaging system in accordance with example embodiments.

One aspect of the disclosed embodiments relates to a flexible image probe for use in the dual-mode, wide-FOV imaging system. FIG. 6 illustrates some embodiments of the disclosed technology and implementation of the probe and a whole mouth imaging assembly. The disclosed mobile imaging system can be implemented with two imaging options. In panel (a1), an intraoral imaging system with a semi-flexible intraoral probe is shown that is connected to the mobile device (showing front view of the phone case). In panel (a2), a whole mouth imaging system using the phone camera is illustrated. The back side of the phone case is shown that includes a circular section on its top. A longpass filter and an analyzer are placed in front of the phone camera. One or more light sources (e.g., while light source, blue or UV sources) provide illumination for the multimode operation. In operation, the patient is instructed to open his/her mouth. Then using the device shown in panel (a2), the back side of the mobile device is moved toward the open cavity of the patient's mouth. In this position, the mouth cavity can be viewed on the screen of the mobile device, and images of the whole mouth can be obtained by utilising white and/or blue/UV light.

The intraoral probe is semi-flexible and can be bent to access all areas of the oral cavity. Panels (b1) to (b3) in FIG. 6 illustrate the probe in straight, bent for inward imaging and outward imaging configurations, respectively. Panels (c1) and (c2) in FIG. 6 illustrate the bent probe that is placed on the printed mouth anatomy to illustrate how the probe can be bent to image the oropharynx and the base of the tongue (weak white triangle from the probe tip shows the illumination and imaging directions). This flexibility allows access to the tongue base and the back of the mouth for imaging tonsils.

Figure 7:
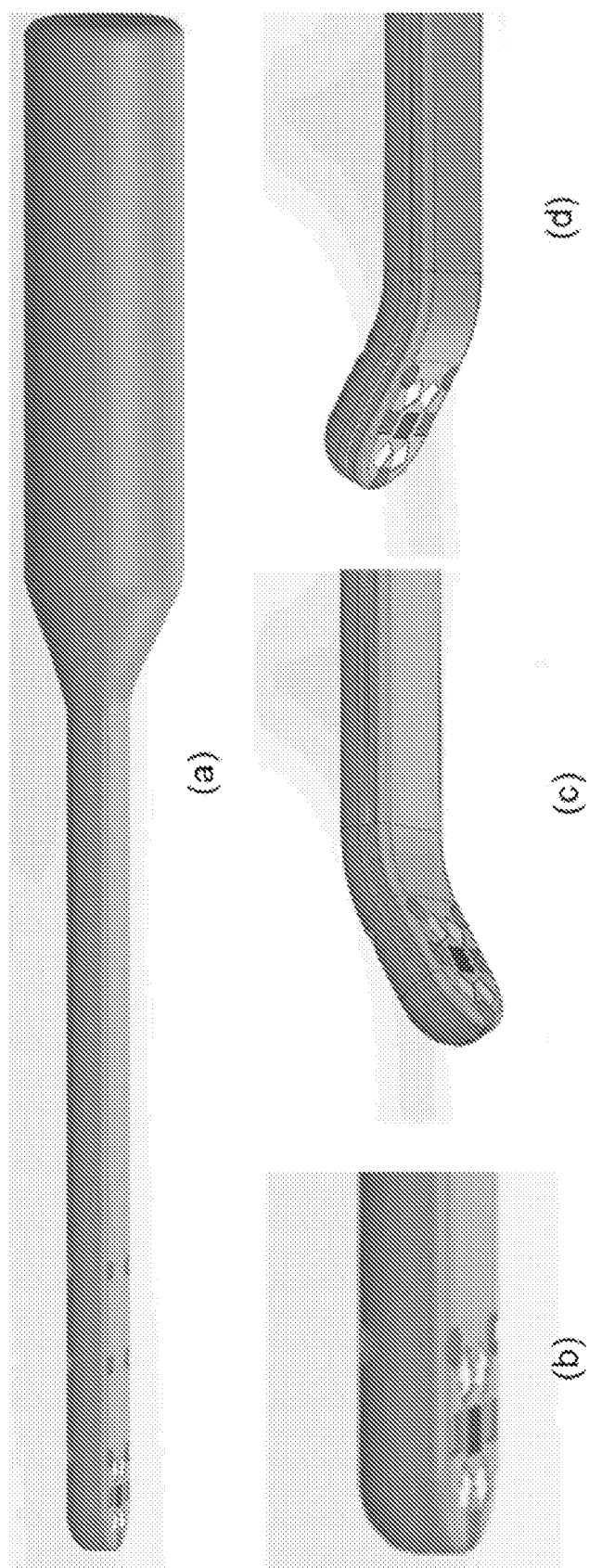
FIG. 7 illustrates a flexible intraoral imaging device in accordance with an example embodiment.
Figure 8:
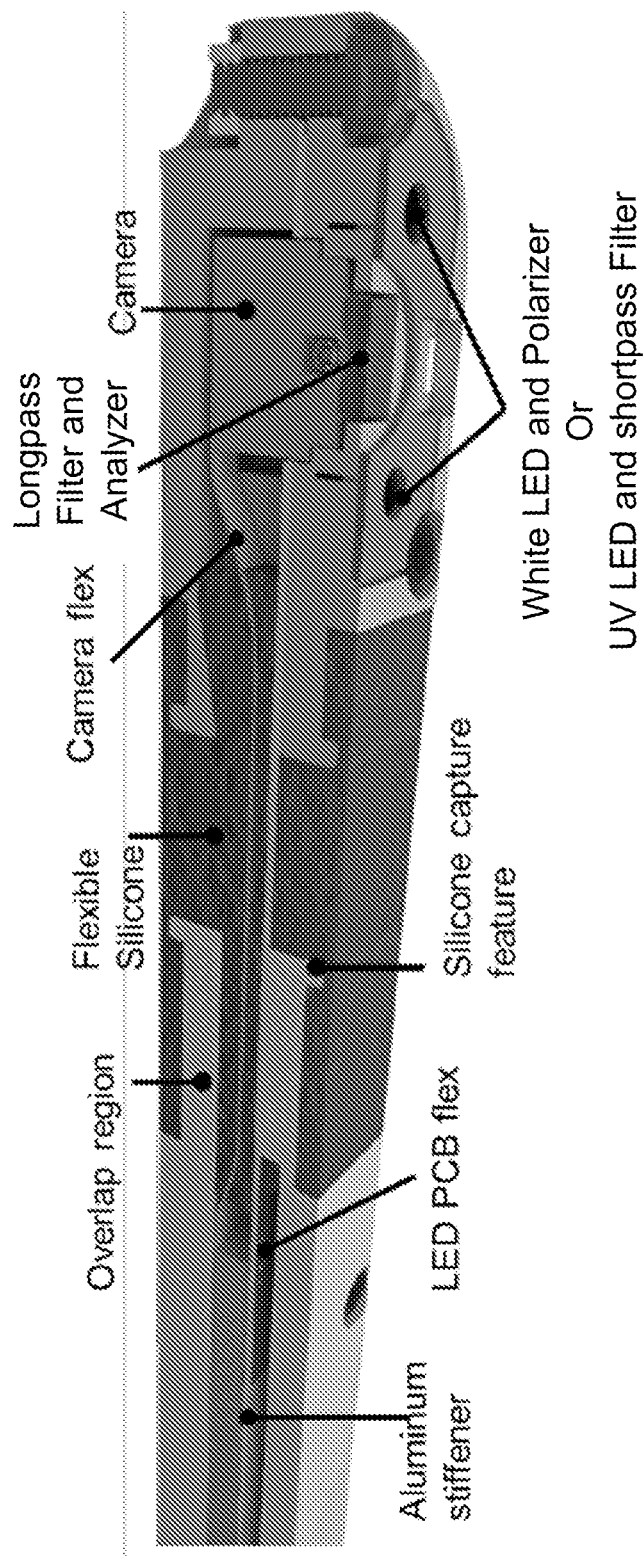
FIG. 8 illustrates a cross-sectional view and associated components of the flexible intraoral imaging device of FIG. 7.

FIG. 7 illustrates an example intraoral camera with 90-degree flexible, soft tip comprising a large, mild fisheye field of view. Panel (a) in FIG. 7 illustrates the camera in a straight configuration, panel (b) illustrates the tip of the camera, and panels (c) and (d) illustrate the tip of the camera in two different bent configurations. FIG. 8 illustrates a cross-section of the device and associated components therein. The intraoral camera includes the following components to capture autofluorescence image and polarized white light image: one set of white LEDs with polarizers in front of them, one set of UV LEDs with shortpass filters in front of them, and a camera with analyzer and longpass filter in front of it. The depicted device is compact, having a 10-mm diameter, and is a 90-degree bendable device with a large (e.g., 3.5 cm×3.5 cm) image area that is expanded by a mild fisheye lens with a 120-degree field of view. Combined with the tip's bendability, the design ensures the ability to view and photograph all areas of the oral cavity, including posterior regions such as base of the tongue and peritonsillar area. These high-risk sites for HPV-related oral cancer cannot be examined in many patients using the naked eye or existing intraoral cameras. To obtain sufficient resolution over the large field of view, a low-cost, high performance 5-megapixel OV5648 chip sensor with 2592×1944 pixels can be used. For controls and viewing, the intraoral camera can be connected to a laptop/tablet/smartphone through plug-in and wireless options. To improve the image quality without specular reflection, a polarizer can be added in front of each LED to provide polarized illumination.

The size (typically 15-25 mm diameter) and rigid design of intraoral cameras hinder access to many high-risk areas of the mouth. The small imaging area and field of view of existing intraoral cameras—typically the size of 2-3 teeth with a 80-90 degree viewing field—considerably limit their usefulness for imaging entire soft tissue lesions, which can be considerably larger, or for screening the entire oral cavity-which is mandated as a part of the standard of care for dentists and hygienists. For example, the borders or base of the tongue, or the buccal mucosa are too large for single-image photographs. Therefore, a large field of view is provided in accordance with the disclosed embodiments. An imaging lens with a small diameter (e.g., <5 mm) and small distortion (e.g., <5%) is provided to achieve excellent image quality for a high resolution (e.g., 5-megapixel) sensor. Most of the surfaces in the optical components are aspherical to enable better image quality and smaller size. The lens materials can include of optical plastic, with established fabrication techniques that use an ultra-precision diamond turning process.

To achieve tip flexibility, in some embodiments, all electronics for the sensor and LEDs are packaged inside the handle portion of the camera, with only the sensor, imaging lens, and LEDs positioned in the camera head. The probe housing can be 3D printed or produced via other techniques. The housing provides mounting locations for the camera, camera PCB (e.g., a flexible PCB), illumination LEDs, polarizers, and wiring while also integrating a 25-mm diameter handle and flexible section near the imaging head. Significantly, the flexible silicone (e.g., Mold Star 20T and Black Silc Pig, Smooth-On, Macungie, PA) section can provide up to: 470% elongation before break, and allowing bending in either direction to better access all areas of the oral cavity. A 250-µm thick, 7-mm wide piece of aluminum sheet metal can be embedded in the flexible section to provide a ductile core to the silicone elastomer, maintaining the probe head angle after bending to the desired position. The aluminum sheet can keep the two sections of the probe attached with notches to capture the screws joining the two halves of the probe head clamshell, while also serving as a thermal sink for the illumination LEDs. To ensure the elastomer stretches with the probe as it is bent and does not pull away from the seams of the 3D-printed plastic/silicone interface (keeping the electronics from being exposed), the silicone can overlap the 3D printed plastic a minimum of 5 mm and a maximum of 10 mm on each end, and 750 µm vertical capture features in the plastic embed into the silicone.

During oral viewing, the white LED provides constant illumination in low power CW mode. During image capture, it can automatically switch to pulsed mode for better image quality. The images can be either automatically or manually uploaded to the cloud. Upload can automatically trigger the AI-driven algorithm to process the image and other information, such as previously recorded risk factor information. Once the processing is finished, an oral cancer risk assessment can be displayed on the screen. The device can further include a disposable sheath for infection control.

One aspect of the disclosed technology relates to a mobile intraoral imaging system that includes a first light source configured to provide white light for illuminating a region in an oral cavity, a second light source configured to provide light in a blue or ultraviolet range of wavelengths for illuminating the region in the oral cavity, and a mobile device comprising a processor and a memory including instructions stored thereon, where the instructions upon execution by the processor cause the processor to receive information associated with reflected and autofluorescent light that is received from the region in the oral cavity. The mobile intraoral imaging system further includes a semi-flexible probe including a tip that is bendable in one or more directions to an angle within a maximum bending range of angles. The semi-flexible probe is changeable in shape to allow insertion in the oral cavity. The semi-flexible probe includes a camera that is positioned at a section of the tip, where the camera is configured to capture the reflected and autofluorescent light from the region in the oral cavity.

In one example embodiment, the first light source and the second light source are positioned in the tip of the semi-flexible probe. In another example embodiment, the first light source and the second light source are positioned at a backside of the mobile device and are configured to provide illumination for substantially all of the oral cavity. In yet another example embodiment where the backside light sources are used, the instructions upon execution by the processor cause the processor to display, in real-time, one or more images obtained using an integrated camera of the mobile device, the images corresponding to at least a section of the oral cavity.

According to another example embodiment, the camera of the semi-flexible probe includes a fisheye lens with a field of view of 120 degrees. In one example embodiment, the camera of the semi-flexible probe includes an imaging lens and a pixelated sensor, where the imaging lens has a diameter that is less than 5 mm. In another example embodiment, the mobile intraoral imaging system includes a polarizer positioned in front of the white light source to improve a quality of images by reducing or removing specular reflections. In yet another example embodiment, the maximum bending range of angles is 90 degrees. In still another example embodiment, the semi-flexible probe includes an aluminum stiffener component positioned within a core section of the semi-flexible probe, wherein the aluminum stiffener enables a bended tip angle to be maintained upon bending the tip to a particular angle. In some embodiments, the mobile intraoral imaging system includes a shortpass filter in front of the second light source to improve a quality of images obtained from the autofluorescence light. In some embodiments, the mobile intraoral imaging system of claim includes an analyzer and a longpass filter in front of the camera to improve a quality of images obtained from the captured reflected and autofluorescence light.

In one example embodiment, a maximum diameter of the semi-rigid probe is 1 cm. In another example embodiment, the semi-flexible probe is coupled to the mobile device through one or more of a wired or a wireless connection to enable reception or transmission of control and data from or to the mobile device. In another example embodiment, the semi-flexible probe includes a probe processor and associated memory to enable image and data processing or transmission of information associated with images captured by the camera. In some example embodiments, the instructions upon execution by the processor cause the processor to activate a mobile application software; the mobile application software configured to: process the information associated with reflected and autofluorescent light that is received from the region in the oral cavity to produce one or more associated images.

In some embodiments, the mobile intraoral imaging system further includes a cloud-based system, and the instructions upon execution by the processor cause the processor to activate a mobile application software; the mobile application software is configured to communicate at least a portion of the information associated with reflected and autofluorescent light that is received from the region in the oral cavity to the cloud-based system, and to receive diagnosis information or guidance from a remote specialist at the mobile device. In one example embodiment, the mobile intraoral imaging system further includes a neural network engine that is configured to receive imaging information associated with the reflected and autofluorescent light, where the imaging information includes a green channel a red channel and a ratio of red to green channel information, and the neural network is configured to produce classification and/or identification information associated with the imaging information.

In another example embodiment, the neural network is a VGG-CNN-M neural network. In one example embodiment, the neural network is implemented as one or more of the following: as part of instructions stored on the memory of the mobile device and executable by the mobile device; or as part of a cloud-based software platform that is configured to receive the imaging information. In another example embodiment, the changeable shape of the semi-rigid probe allows examination of posterior regions of the oral cavity, including a base of tongue, a peritonsillar area or a tonsillar region of oropharynx.

According to some embodiment, the mobile device of the mobile intraoral imaging system is one of a mobile phone, a tablet computer, or a laptop. In still another example embodiment, the mobile intraoral imaging system is configured to operate in one or more of the following modes of operation: (A) in a dual mode of operation consisting of polarized white light imaging (pWLI) and autofluorescence imaging (AFI); (B) in whole mouth imaging configuration, wherein the first light source and the second light source are positioned at a backside of the mobile device and are configured to provide illumination for substantially all of the oral cavity; or (C) an intraoral imaging configuration that uses the semi-flexible probe to receive the reflected and autofluorescent light that is received from the region in the oral cavity.

Another aspect of the disclosed embodiments relates to a semi-flexible probe for use in a mobile intraoral imaging system, wherein the semi-flexible probe includes a tip that is bendable in one or more directions to an angle within a maximum bending range of angles, and the semi-flexible probe is changeable in shape to allow insertion in an oral cavity. The semi-flexible probe also includes a camera positioned at a section of the tip, where the camera is configured to capture reflected and autofluorescent light from a region in the oral cavity.

Figure 9:
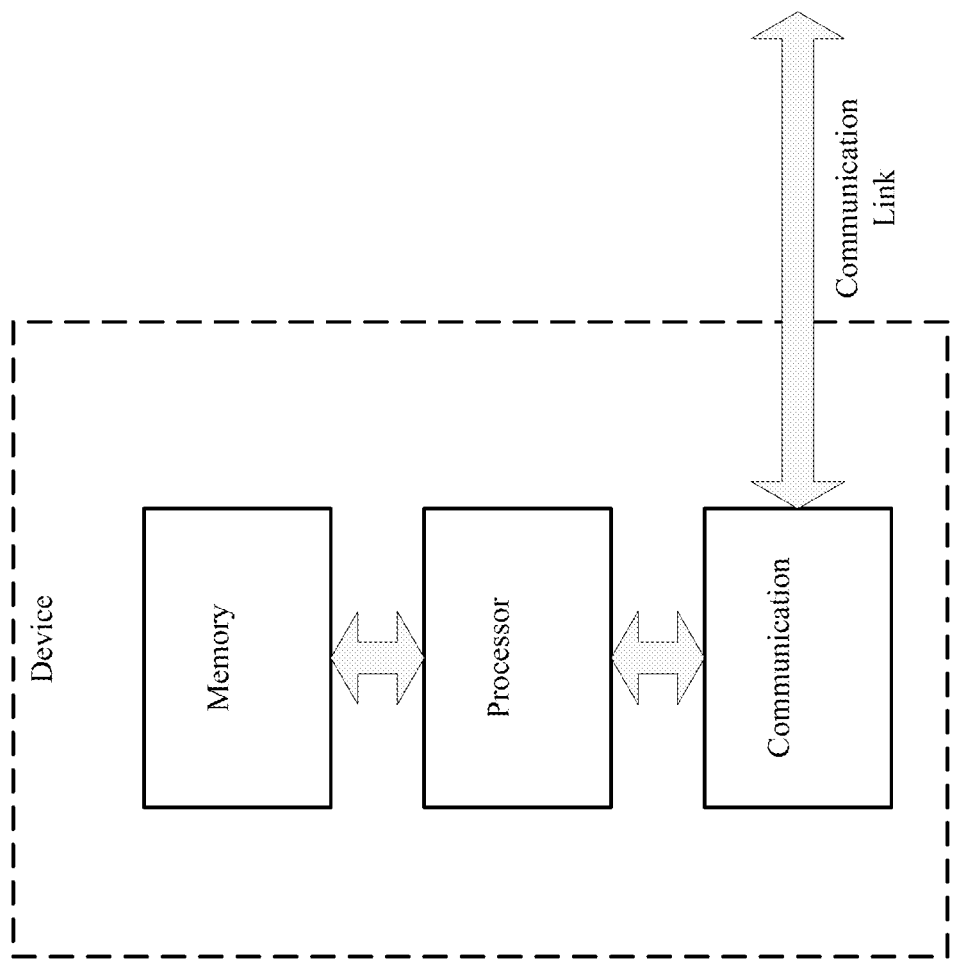
FIG. 9 illustrates a block diagram of a device that can be used to implement certain aspects of the disclosed technology.

FIG. 9 illustrates a block diagram of a device that can be used to implement certain aspects of the disclosed technology. For example, the device of FIG. 9 can be used as part of the intraoral camera system and/or mobile device to receive, process, store, provide for display and/or transmit various data and signals. The device in FIG. 9 comprises at least one processor and/or controller, at least one memory unit that is in communication with the processor, and at least one communication unit that enables the exchange of data and information, directly or indirectly, through the communication link with other entities, devices, databases and networks. The communication unit may provide wired and/or wireless communication capabilities in accordance with one or more communication protocols, and therefore it may comprise the proper transmitter/receiver, antennas, circuitry and ports, as well as the encoding/decoding capabilities that may be necessary for proper transmission and/or reception of data and other information.

The processor(s) may include central processing units (CPUs) to control the overall operation of, for example, the host computer. In certain embodiments, the processor(s) accomplish this by executing software or firmware stored in memory. The processor(s) may be, or may include, one or more programmable general-purpose or special-purpose microprocessors, digital signal processors (DSPs), programmable controllers, application specific integrated circuits (ASICs), programmable logic devices (PLDs), graphics processing units (GPUs), or the like, or a combination of such devices.

The memory represents any suitable form of random access memory (RAM), read-only memory (ROM), flash memory, or the like, or a combination of such devices. In use, the memory may contain, among other things, a set of machine instructions which, when executed by processor, causes the processor to perform operations to implement certain aspects of the presently disclosed technology.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Various information and data processing operations described herein may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media that is described in the present application comprises non-transitory storage media. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Only a few implementations and examples are described and other implementations, enhancements and variations can be made based on what is described and illustrated in this patent document.

What is claimed is:

1. A mobile intraoral imaging system, comprising:
a first plurality of light sources configured to provide white light for illuminating a region in an oral cavity;
a second plurality of light sources configured to provide light in a blue or ultraviolet range of wavelengths for illuminating the region in the oral cavity;
a mobile device comprising a processor and a memory including instructions stored thereon, the instructions upon execution by the processor cause the processor to receive information associated with reflected and autofluorescent light that is received from the region in the oral cavity;
a semi-flexible probe including a tip that is bendable in one or more directions to an angle within a maximum bending range of angles, the semi-flexible probe changeable in shape to allow insertion in the oral cavity, the semi-flexible probe comprising a camera positioned at a section of the tip, the camera configured to capture the reflected and autofluorescent light from the region in the oral cavity, wherein mobile intraoral imaging system is configured to operate in multiple modes of operation that include:
(1) in a dual mode of operation utilizing polarized white light imaging (pWLI) and autofluorescence imaging (AFI);
(2) in whole mouth imaging configuration utilizing a flat backside of the mobile device and an integrated camera that is part of the mobile device, wherein at least one of the first plurality of light sources and at least one of the second plurality of light sources are positioned at the flat backside of the mobile device, and are configured to provide illumination for substantially all of the oral cavity, the flat backside of the mobile device further including a backside longpass filter and a backside analyzer positioned in front of the integrated camera of the mobile device; and
(3) an intraoral imaging configuration that uses the semi-flexible probe to receive the reflected and autofluorescent light that is received from the region in the oral cavity.

2. The mobile intraoral imaging system of claim 1, wherein one or more of the first plurality of light sources and the second plurality of light sources are positioned in the tip of the semi-flexible probe.

3. The mobile intraoral imaging system of claim 1, wherein the instructions upon execution by the processor cause the processor to display, in real-time, one or more images obtained using the integrated camera of the mobile device, the images corresponding to the whole mouth.

4. The mobile intraoral imaging system of claim 1, wherein the camera of the semi-flexible probe includes a fisheye lens with a field of view of 120 degrees.

5. The mobile intraoral imaging system of claim 1, wherein the camera of the semi-flexible probe includes an imaging lens and a pixelated sensor, the imaging lens having a diameter that is less than 5 mm.

6. The mobile intraoral imaging system of claim 1, comprising a polarizer positioned in front of one or more of the first plurality of light sources to improve a quality of images by reducing or removing specular reflections.

7. The mobile intraoral imaging system of claim 1, comprising a shortpass filter in front of one or more of the second plurality of light sources to improve a quality of images obtained from the autofluorescence light.

8. The mobile intraoral imaging system of claim 1, wherein the maximum bending range of angles is 90 degrees.

9. The mobile intraoral imaging system of claim 1, comprising an analyzer and a longpass filter in front of the camera of the semi-flexible probe to improve a quality of images obtained from the captured reflected and autofluorescence light.

10. The mobile intraoral imaging system of claim 1, wherein the semi-flexible probe includes an aluminum stiffener component positioned within a core section of the semi-flexible probe, the aluminum stiffener enabling a bended tip angle to be maintained upon bending the tip to a particular angle.

11. The mobile intraoral imaging system of claim 1, wherein a maximum diameter of the semi-rigid probe is 1 cm.

12. The mobile intraoral imaging system of claim 1, wherein the semi-flexible probe is coupled to the mobile device through one or more of a wired or a wireless connection to enable reception or transmission of control and data from or to the mobile device.

13. The mobile intraoral imaging system of claim 1, wherein the semi-flexible probe includes a probe processor and associated memory to enable image and data processing or transmission of information associated with images captured by the camera of the semi-flexible probe.

14. The mobile intraoral imaging system of claim 1, wherein the instructions upon execution by the processor cause the processor to activate a mobile application software, the mobile application software configured to:
process the information associated with reflected and autofluorescent light that is received from the region in the oral cavity to produce one or more associated images.

15. The mobile intraoral imaging system of claim 1, further comprising a cloud-based system, wherein the instructions upon execution by the processor cause the processor to activate a mobile application software, the mobile application software configured to communicate at least a portion of the information associated with reflected and autofluorescent light that is received from the region in the oral cavity to the cloud-based system, and to receive diagnosis information or guidance from a remote specialist at the mobile device.

16. The mobile intraoral imaging system of claim 1, further including a neural network engine that is configured to receive imaging information associated with the reflected and autofluorescent light, the imaging information including a green channel a red channel and a ratio of red to green channel information, the neural network configured to produce classification and/or identification information associated with the imaging information.

17. The mobile intraoral imaging system of claim 16, wherein the neural network is a VGG-CNN-M neural network.

18. The mobile intraoral imaging system of claim 16, wherein the neural network is implemented as one or more of the following:
as part of instructions stored on the memory of the mobile device and executable by the mobile device; or
as part of a cloud-based software platform that is configured to receive the imaging information.

19. The mobile intraoral imaging system of claim 1, wherein the changeable shape of the semi-rigid probe allows examination of posterior regions of the oral cavity, including a base of tongue, a peritonsillar area or a tonsillar region of oropharynx.

20. The mobile intraoral imaging system of claim 1, wherein the mobile device is a mobile phone.

21. The mobile intraoral imaging system of claim 1, comprising a circular protrusion at the flat backside of the mobile device and at least partially surrounding the at least one of the first plurality of light sources and the at least one of the second plurality of light sources that are positioned at the flat backside of the mobile device to enable positioning of the flat backside of the mobile device at a patient's open mouth for obtaining whole mouth images.

* * * * *